United States Patent [19]
Kim et al.

[11] Patent Number: 5,904,849
[45] Date of Patent: *May 18, 1999

[54] HIGHLY PACKED FIBER BUNDLE CONTACTOR AND STATIC LIQUID-LIQUID CONTACTING METHOD USING SAME

[75] Inventors: Kwang-Wook Kim; Eil-Hee Lee; Jae-Hyung Yoo; Hyun-Soo Park, all of Daejeon-Si, Rep. of Korea

[73] Assignee: Korea Atomic Energy Research Institute, Daejeon-Si, Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 08/816,577

[22] Filed: Mar. 13, 1997

[30] Foreign Application Priority Data

Oct. 28, 1996 [KR] Rep. of Korea ...................... 96-49192

[51] Int. Cl.$^6$ ........................ B01D 11/00; B01D 17/022
[52] U.S. Cl. ........................ 210/511; 210/634; 422/256
[58] Field of Search ...................... 210/634, 511, 210/497.01, 500.23, 321.8, 321.89; 422/256

[56] References Cited

U.S. PATENT DOCUMENTS

| | | | |
|---|---|---|---|
| 2,361,780 | 10/1944 | Lewis | 210/634 |
| 3,754,377 | 8/1973 | Clonts | 55/73 |
| 3,758,404 | 9/1973 | Clonts | 208/263 |
| 3,839,487 | 10/1974 | Clonts | 260/683.48 |
| 4,056,462 | 11/1977 | Li | 210/634 |
| 4,059,670 | 11/1977 | Kakihana et al. | 423/7 |
| 4,416,782 | 11/1983 | Kerres | 210/634 |
| 4,729,832 | 3/1988 | Leonard | 210/634 |
| 4,771,616 | 9/1988 | Sun | 68/181 R |
| 4,786,414 | 11/1988 | Priestley | 210/634 |
| 4,810,387 | 3/1989 | Sasaki | 210/634 |
| 4,941,998 | 7/1990 | Eiben | 210/634 |
| 4,978,492 | 12/1990 | Sun | 264/180 |
| 5,096,567 | 3/1992 | Paspek | 210/634 |
| 5,204,002 | 4/1993 | Belfort | 210/634 |

OTHER PUBLICATIONS

C.J. King, Separation Process, 1974, pp. 767–768, McGraw Hill.

A.N. Sembira et al., Characteristics of a Motionless Mixer for Dispersion of Immiscible Fluids–I. A Modified Electroresistivity Probe Technique, Chemical Engineering Science vol. 41, No. 3, pp. 445–455, Pergamon Press Ltd., 1986.

R.J. Anderson and T.W.F. Russell, Designing for Two–Phase Flow—Part I, Dec. 6, 1965, Chemical Engineering, pp. 139–144, University of Delaware.

R.J. Anderson and T.W.F. Russell, Designing for Two–Phase Flow–Part III, Jan. 3, 1966, Chemical Engineering, pp. 87–90, University of Delaware.

David Wolf, Rachamin Shai, and D.H. White, Experimental Study of Dispersion and Separation of Phases in Liquid–Liquid Extraction of Copper by LIX 64N in Various Types of Mixers, Ind. Eng. Chem Process Des. Dev., 1980, vol. 19 pp. 522–526.

S.C. Pan, A New Type of Continuous Countercurrent Extraction: An Extractor with Two Continuous Phases, Separation Science, 1974, vol. 9(3) pp. 227–248.

New Mass–Transfer Method, Sep. 30, 1974, Chemical Engineering, p. 54.

Abstract of U.S. Pat. No. 4771616, Issued Sep. 20, 1988, Apparatus and Method to Extract Material from a Running Length of Fiber, Sun et al.

Abstract of U.S. Pat. No. 4978492, Issued Dec. 18, 1990, Method to Extract Material from a Running Length of Fiber, Sun et al.

*Primary Examiner*—Ernest G. Therkorn
*Attorney, Agent, or Firm*—Nikaido Marmelstein Murray & Oram LLP

[57] ABSTRACT

Disclosed is a fiber bundle contactor in which fibers are packed in high density within a column. When two liquid phases flowing in parallel, one of which contains the desired components, are contacted with the entryway of the highly packed fiber bundle, the two liquid phases are very thinly dispersed among gaps around the respective fibers by capillary action induced by the clearance between the fibers. By means of this capillary action, the two liquid phases are maintained as a continuous stream, and the two phases are brought into very intimate contact, thereby ensuring a very large surface area for liquid-liquid extraction to proceed.

3 Claims, No Drawings

HIGHLY PACKED FIBER BUNDLE CONTACTOR AND STATIC LIQUID-LIQUID CONTACTING METHOD USING SAME

BACKGROUND OF THE INVENTION

The present invention relates to a highly packed fiber bundle contactor, and a static liquid-liquid contacting method using the fiber bundle contactor. The invention also relates to a manufacturing method for producing the highly packed fiber bundle contactor.

In order to separate or purify components of homogeneous mixtures, a liquid-liquid extraction, i.e. a solvent extraction, is frequently used. The extraction procedure involves the redistribution of the desired components between two liquid phases which are in contact with each other but are immiscible due to differences the mutual chemical or physical properties of the phases. Liquid-liquid extraction is applied in numerous chemical industries, including pharmaceutical and biomedical industries to produce pure chemical compounds, heavy organic and analytical chemistry, waste purification, etc.

In the liquid-liquid extraction process presently known in the art, one phase must be dispersed in the other phase in droplets by physical agitation to generate a large material transfer area for mass transfer of the desired components between the two phases. In general, the smaller the droplet size, the greater the transfer. There are many kinds of mechanically agitated contactors known in the art for generating small droplets, for example a simple impeller in a unit tank, a mixer-settler, a rotating disc contactor, an Oldshue-Rushton contactor, a Kühni extractor, an AKUFVE system using centrifugal force, a sieve-plate pulsed column, etc. Each has its own advantage and disadvantage, depending on the exact structure and purpose for which it is used. Most, however, are complicated in structure and large in size so that they are not suitable for treatment of small volumes of material. In addition, if the device is installed at a location difficult to access (such as a radioactive area), it may be difficult to fix any mechanical troubles.

There are non-mechanically agitated contactors which overcome some of the disadvantages associated with mechanically agitated contactors. Examples of non-mechanically agitated contactors include spray columns and packed columns. Their main advantage is the absence of mechanical moving parts. In the spray column, one phase is dispersed as drops that move up through the continuous phase as a result of the difference in phase densities between the two phases. However, such contactors do not have a large liquid-liquid contacting area per unit volume, compared with mechanically agitated contactors, because the lack of mechanical agitation results in a greater droplet size which reduces the surface area of the dispersed phase, resulting in reduced contact between the dispersed phase and the desired components.

A conventional packed column is simply a spray column whose shell is filled with packing pieces. The packing of the spray column reduces axial mixing within the column, lengthens residence time of flowing phases, and causes distortion of the dispersed drops. This results in an increase of mass transfer rate. However, the packing itself also reduces the area available for the flow of liquid phases such that throughput is decreased and flooding can more easily occur.

Another non-mechanically agitated contactor is the Kenics mixer, also called a motionless mixer. In this mixer, the liquids are pumped concurrently through a tube containing a series of helical shaped elements which cut the flow of the liquid phases and bring the liquids into more intimate contact. The maintenance and operation of the equipment is relatively simple, and flooding is avoided.

Contactors are known in the art which are based on the use of fiber bundles (see U.S. Pat. Nos. 3,754,377; 3,758,404; and 3,839,487). In these contactors, a series of thick fiber strands are inserted into a column. The strands are not compressed, but instead maintain their individual integrity. When the ends of the fibers are soaked in a first liquid, the liquid wets the fiber strands and moves to the other end of the tube by capillary action induced by small pores within the fiber strands, comparable to the action of a wick in a kerosene lamp. A second liquid is contacted with the tube, but made to flow around the fiber strands so as to be contacted with the first liquid contained within the fibers at the surface of the fiber strands. The flow rate of the second liquid flowing around the fiber strands is controlled by a pump, while the flow rate of the first liquid within the fiber strands is controlled by the capillary action within the fibers. Therefore, in order to process a great quantity of liquid, a very wide column is required for increasing the flow quantity of the first liquid flowing within the fiber strands. This results in the need of a large apparatus.

In all of the liquid-liquid contactors mentioned above which rely on agitation of the liquid phases, i.e. mechanically agitated contactors, the agitation of the two liquid phases generates the dropwise dispersion of one phase into the other phase. This process is accompanied by the endless breakage and coalescence of the drops. The amount of dispersion of the dispersed phase depends on the density difference between the two phases, interfacial tension, viscosity, and so on. Information on dispersion, such as the drop size and distribution during agitation, which are important variables in the liquid-liquid extraction systems mentioned above, is required for analyses of the hydrodynamics and the mass transfer. However, obtaining such data is often not easy, and requires effort. In addition, since almost all of the contactors mentioned above (with the notable exception of the Kenics mixer) utilize the density differences of the two liquid phases under the effects of gravity, these apparatuses must have a vertical shape, which thereby restricts the use of work space for a particular series of experiments.

It is an object of the present invention to minimize or eliminate the problems associated with liquid-liquid contactors known in the art.

SUMMARY OF THE INVENTION

The present invention is directed to a fiber bundle contactor in which fibers are packed in high density within a column. When two liquid phases flowing in parallel, one of which contains the desired components, are contacted with the entryway of the highly packed fiber bundle, the two liquid phases are very thinly dispersed among gaps around the respective fibers by capillary action induced by the clearance between the fibers. By means of this capillary action, the two liquid phases are maintained as a continuous stream, and the two phases are brought into very intimate contact, thereby ensuring a very large surface area for liquid-liquid extraction to proceed. Liquid-liquid contact with a large surface area is provided without the use of droplet dispersion, as known in the art. In addition, the use of mechanical driving parts is not necessary.

The present invention relies on an entirely different principle than the droplet dispersion principle now employed in agitators known in the art. The present apparatus is simple in structure and easy to manufacture, yet provides better contact between the two liquid phases per unit volume than any existing contactor.

The present invention also relies on a different principle than the fiber bundle contactors of the prior art. In the present invention, the fiber bundles are compressed such that the capillary action occurs in the clearance between the fibers, as opposed to the prior art fiber bundle contactors, which rely on capillary action within the fibers. In the present invention, the rate of fluid flowing through the contactor can be further controlled by a pump which forces the two phases into the clearance between the fibers. The flow operation within a packing of fibers is realized through capillary action and convective force by pumping. Accordingly, the amount of liquid that can be processed as well as the liquid-liquid contacting area per unit volume is greater in the present invention than that shown in prior art fiber bundle contactors.

DETAILED DESCRIPTION OF THE INVENTION

The basic concept of the fiber bundle contactor of the present invention is as follows. When a first liquid phase and a second liquid phase are fed into the highly packed fiber bundle contactor of the present invention with enough pressure to overcome the surface tensions of the liquids and the drag forces due to the liquid passing through the highly packed fiber bundle, then capillary action is induced by the clearance between the fibers. The phases spread among the clearance, and are maintained in continuity within the contactor. The close contact of the two phases brought about by the capillary action results in a large interfacial area for mass transfer of the desired components between the two phases. The two phases are thereafter discharged from the fiber bundle contactor in a thoroughly mixed state.

The thickness of the layers of the two flowing phases forming the interfacial area for mass transfer of desired components is extremely small. It is difficult to measure the thickness of the interfacial area formed between the fibers, but the following characteristics can be used to provide a general description. The fibers used in the highly packed fiber bundle contactor of the present invention have a certain elasticity and the packed fiber strands are considerably compressed when they are inserted into a tube. A clearance between them would be about $10^{-7}$ to $10^{-8}$ mm, or less. There is no specific condition such as thickness or density that the fiber used in the present invention must satisfy. However, the fiber used should be inert against the liquid that it will contact, and should be thin enough to induce capillary action against the liquid when provided in a predetermined space, such as a tube. In addition, a predetermined number of fiber strands should be maintained.

Although the fiber bundle contactor of the present invention supplies a large contact area equivalent to or greater than that experienced with mechanically agitated contactors, there is no drop phenomena, turbulence or back mixing effect in the fiber bundle contactor of the present invention because of structural characteristics of the fiber contactor which are not present in prior art non-mechanically agitated contactors. The present invention is also useful for the study of mass transfer kinetics because of its stable liquid-liquid interface.

The structure of the fiber bundle contactor of the present invention is simple, compared with mechanically agitated contactors, and the amount of liquid which fills the space between the fibers is comparatively small, compared with non-mechanically agitated contactors. The fiber bundle contactor of the present invention can be installed in any direction, i.e., not necessarily vertical, because gravitational effects are not needed.

The fibers used for manufacturing the fiber bundle contactor of the present invention are preferably stable against the two liquid phases making contact with the fiber bundle contactor, and are preferably sufficiently thin to allow the creation of very fine capillary spaces between the fibers. It is preferred that about 1500 polyester strands of 40s/2 be used. The tube in which the fibers are located must, in addition to being stable against the two liquid phases making contact with the fiber bundle contactor, have the strength to withstand the interior pressure exerted by the two liquid phases as they pass through the fiber bundle contactor.

What follows is a description of an extraction apparatus using the highly packed fiber bundle contactor of the present invention. A phase separator 1 which is provided with an interface level controller 1 is connected to Raffinate tanks. Through an liquid discharge end thereof, the highly packed fiber bundle contactor of the present invention, comprising a highly packed fiber bundle located within a tube, is in fluid communication with the phase separator, such that liquid flowing through the highly packed fiber bundle contactor thereafter flows into the phase separator. The highly packed fiber bundle contactor is connected at a liquid inlet end thereof to storage tanks and, through pumps and flow controllers. Each of the storage tanks and contains a liquid phase.

The two liquid phases located in storage tanks and are contacted with the highly packed fiber bundle contactor at the liquid inlet end thereof. The two liquid phases enter the fiber bundle contactor and are very thinly dispersed among the clearances in the highly packed fiber bundle, as described above. As the two phases are brought into very intimate contact, the desired components are transferred between the two liquid phases. The two liquid phases are thereafter discharged from the fiber bundle contactor in a thoroughly mixed state, through the liquid discharge end thereof. The mixed liquid phases are thereafter separated in the phase separator, which is in fluid communication with the liquid discharge end of the fiber bundle contactor.

Preferably, pumps and, which supply the two liquid phases to the fiber bundle contactor, supply a constant small quantity of liquid and have sufficient discharging pressure to allow the two liquid phases to pass through the highly packed fiber bundle. Flow ratio is precisely controlled by flow controllers and, which ensure that the flow ratio is maintained to result in maximum component transfer. Since the liquid-liquid extraction process can be influenced by temperature, it is preferable that the fiber bundle contactor is housed in a water jacket to maintain the desired temperature within the fiber bundle contactor.

EXPERIMENTS

Fine fiber bundles for induction of capillary phenomena were prepared by packing approximately 1,500 strings of polyester (40s/2) within Pyrex glass tubes of 0.88 cm in diameter and of 5.8, 7.8, 12.8 and 18.8 cm in length. A water jacket surrounded the outside wall of the Pyrex tube to keep a constant temperature of 25° C. (±1° C.) during the experiments. Each flow rate of the two liquid phases was controlled by flow meters and variable pumps with high back pressure (in this case, 1.5 bar) and pulsation as low as possible. The mixture of the two immiscible liquid phases coming out of the fiber bundle went to a separator actuated with a solenoid valve and an interface level controller. The phase ratio of the mixture was measured with a mass cylinder.

In order to test the performance of the fiber contactor, an extraction system selected as the two immiscible liquid phases (hereinafter referred to as "organic phase" and "aqueous phase") was a chemical system of uranyl ion in 2.0M nitric acid and 30 Vol. % tri-butyl phosphate (TBP) in n-dodecane. The extraction reaction is expressed as follows:

$(UO_2^{2+})_{Aq}+(2NO_3^-)_{Aq}+(2TBP)_{Org}=(UO_2(NO_3)_2\cdot 2TBP)_{Org}$.

The experimental parameters and their ranges used were as follows:

TABLE 1

Experimental Parameters and Their Ranges

| Parameters | Phase Ratio (Org./Aq.) | Aqueous Flow Rate (ml/min) | Organic Flow Rate (ml/min) | Column Length (cm) |
|---|---|---|---|---|
| Ranges | 0.1~2.0 | 0.5~9.3 | 0.2~2.8 | 5.7~18.8 |

For the comparison of the continuous extraction result from the static fiber contactor of the present invention with one of batch extraction, a batch-type extraction was carried out. The phase ratio of batch extraction was 1.0, and the two phases were strongly mixed by a magnetic stirrer for 10 minutes. In both extraction experiments, the extraction yield was measured. For the uranium concentration analysis, the absorbance of uranyl ion in nitric acid was measured at 414.6 nm by a spectrophotometer (Shimadzu Co., Model No. UV-160A).

The extraction yield was calculated as follows:

$((C_{Aq\ in}-C_{Aq\ out})/C_{Aq\ in}\times 100)$.

Experiment 1

The extraction yield by a fiber contactor having a length of 12.8 cm calculated in Experiment 1, with a change of phase ratio (i.e., the change of organic flow rate) at fixed aqueous flow rates of 0.67, 1.0, 1.5 and 1.67 ml/min. The extraction yields increase with the phase ratio. At a fixed aqueous flow rate, the increase of organic flow rate results in an increased chance that the uranyl ion in the aqueous phase contacts a free TBP in the organic phase so that the extractability of the system is enhanced. The relationship of the extraction yield to the phase ratio and the distribution coefficient can be expressed as follows:

$$E_{yield} = \frac{D\times\text{Phase ratio}}{D\times\text{Phase ratio} + 1}$$

where D is the distribution coefficient ($C_{org}/C_{aq}$ at phase ratio of 1 under equilibrium). In the continuous extraction, the phase ratio is represented as a ratio of organic flow rate to aqueous flow rate. In view of the above equation, the extraction yield numerically approaches 1 as the phase ratio increases. This can explain the tendency of the result in Experiment 1. The distribution coefficient of uranium of 5 g/l obtained by the batch extractor using 2.0M nitric acid and 30 Vol. % TBP was about 13.5, and the extraction yield was about 93.1%. The extraction yields of the fiber contactor at a phase ratio of 1 is nearly the same as the batch extractor, independent of aqueous flow rates. This means that the static liquid-liquid fiber bundle contactor of the present invention generates a contact area large enough to perform well even within a small space.

Experiment 2

Experiment 2 shows the ratio (hereinafter expressed as $E_{Column}/E_{Batch}$) of the extraction yields by the fiber bundle contactor of the present invention and a batch extractor under the same phase ratio, with a change of the phase ratio at several fixed aqueous flow rates. The ratios of $E_{Column}/E_{Batch}$ at all phase ratios in Experiment 2 are nearly 1.0. The small deviation at low phase ratios is considered to be due to error of measurement of phase ratio in the continuous operation. These results show that the fiber bundle contactor of the present invention has an extraction performance basically the same as a perfect batch extraction. The results also suggest that the fiber bundle contactor of the present invention offers residence times sufficient for the extraction system to reach an equilibrium state at the aqeous flow rates in this Experiment. In other words, the aqueous flow rates used in this Experiment for the contactor having a length of 12.8 cm are still low enough for the aqueous phase to contact sufficiently with the organic phase.

Experiment 3

This experiment was conducted in order to examine whether a critical column length existed to affect the $E_{Column}/E_{Batch}$ ratio. The ratios of $E_{Column}/E_{Batch}$ were calculated with a change of phase ratio at several column lengths of 5.8, 7.8, 12.8 and 18.8 cm and a fixed aqueous flow rate of 1.0 ml/min. The ratios throughout the entire phase ratio range were at 1, regardless of the changes in column length.

Experiment 4

This experiment was conducted in order to examine whether a critical aqueous flow rate existed to affect the $E_{Column}/E_{Batch}$ ratio. The ratios of $E_{Column}/E_{Batch}$ were calculated with a change in aqueous flow rate at a fixed organic flow rate of 1.2 ml/min. In the case of the column of 5.8 cm in length, the ratio of $E_{Column}/E_{Batch}$ begins to deviate from 1 as the aqueous flow rate increases over 2 ml/min, indicating lower performance at these parameters than batch extraction. In the case of the column of 18.8 cm in length, the ratio is maintained at 1 up to an aqueous flow rate of about 6 ml/min. This indicates that the aqueous flow rate at which the deviation begins is proportional to column size.

Experiment 5

This Experiment shows the superficial velocities of the aqueous flow at which the ratio of $E_{Column}/E_{Batch}$ just starts to deviate from 1 in Experiment 4, and the residence time of the aqueous flow within the fiber contactor at that time. The superficial velocity was calculated by dividing the aqueous flow rate at which the ratio of $E_{Column}/E_{Batch}$ just starts to deviate from 1 for each column length by the cross sectional area of the fiber contactor. The residence time was calculated by dividing each column length by the superficial velocity as obtained above. The superficial velocity of the aqueous phase increases linearly with the column length. This means that even a high aqueous flow rate is suitable for maintaining the ratio of $E_{Column}/E_{Batch}$ at 1 if a long column is used. In other words, a long fiber bundle contactor has the same performance as an ideal batch extraction, even at high aqueous flow rates.

The residence time in Experiment 5 is consistently about 1.9 minutes. This indicates that the aqueous flow in each column should be retained in the fiber bundle contactor for at least a constant time (in this case, about 1.9 minutes) in order to keep the ratio of $E_{Column}/E_{Batch}$ at 1 (and thereby give the same performance as batch extraction). It is clear that residence time is related to equilibrium state of the extraction reaction system. In this case, the TBP-uranyl ion extraction reaction system used in the present set of experiments need about 1.9 minutes to reach its equilibrium state.

Experiment 6

In order to confirm that the obtained 1.9 minutes is the same amount of time as that required for the extraction system in the batch extraction to reach an equilibrium, a measurement of the change in uranium concentration in 2.0M nitric acid with time (i.e., the change in extraction yield during a batch extraction by 30 Vol. % TBP with a phase ratio of 1) was carried out. The results are shown in this Experiment. The extraction yield reached a steady state value (an extraction yield of about 93%) in about 1.8 minutes. Accordingly, the residence time defined in the present set of experiments is about equivalent to the time required for the extraction reaction to reach an equilibrium state. This suggests that the fiber bundle contactor of the present invention may also be used in a kinetic study of an extraction reaction system by measuring the extraction yield of the fiber bundle contactor and thereafter calculating $E_{Column}/E_{Batch}$ with a change of aqueous flow rate in a fiber column.

Experiment 7

Experiment 7 shows the extraction yields of uranium by the fiber bundle contactor of the present invention with a change of extraction times. The aqueous raffinate from the organic/aqueous phase separator was again fed into a new fiber bundle contactor, along with a new organic phase. The extraction yield with respect to the initial concentration of the first stage approached more than 99% after three times.

The scope of the present invention is to be determined with reference to the following claims.

What is claimed is:

1. An apparatus for liquid-liquid extraction using a plurality of liquid phases, comprising:

a fiber bundle contactor for dispersing the plurality of liquid phases, comprising a vessel having a liquid inlet end and a liquid discharge end and a plurality of fiber strands densely packed therein such that when the plurality of liquid phases is contacted with the liquid inlet end of the vessel, the plurality of liquid phases is dispersed among clearences between respective fiber strands by capillary action which is induced by the clearances, while capillary action within the respective fiber strands is avoided, a liquid-liquid phase separator, in fluid communication with the fiber bundle contactor through the liquid discharge end thereof, and a plurality of vessels, each suitable for containing one of the plurality of liquid phases, in fluid communication with the fiber bundle contactor through the liquid inlet end thereof.

2. The apparatus of claim 1, further comprising a plurality of pumps, each located between one of the plurality of vessels and the liquid inlet end of the fiber bundle contactor.

3. The apparatus of claim 1, further comprising a plurality of raffinate vessels each in fluid communication with the liquid-liquid phase separator.

\* \* \* \* \*